United States Patent
Chakravarthy et al.

(10) Patent No.: US 12,050,550 B2
(45) Date of Patent: Jul. 30, 2024

(54) SYSTEMS AND METHODS FOR DATA VALIDATION

(71) Applicant: Walmart Apollo, LLC, Bentonville, AR (US)

(72) Inventors: Susarla Sitarama S Chakravarthy, Bangalore (IN); Ankit Singh, Bangalore (IN); Pranabh Kumar Thaduri, Hyderabad (IN); Kishore Tupili, Bangalore (IN); James T. Motter, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/964,785

(22) Filed: Oct. 12, 2022

(65) Prior Publication Data

US 2024/0126718 A1    Apr. 18, 2024

(51) Int. Cl.
*G06F 16/11*  (2019.01)
*G06F 16/21*  (2019.01)
*G06F 16/25*  (2019.01)

(52) U.S. Cl.
CPC .......... *G06F 16/119* (2019.01); *G06F 16/214* (2019.01); *G06F 16/258* (2019.01)

(58) Field of Classification Search
CPC ...... G06F 16/119; G06F 16/214; G06F 16/27; G06F 3/0647; G06F 16/258

USPC ................ 707/610, 687, 698, 690, 758, 809
See application file for complete search history.

(56) References Cited

U.S. PATENT DOCUMENTS

| | | |
|---|---|---|
| 10,798,165 B2 | 10/2020 | Srinivasan |
| 11,182,366 B2 * | 11/2021 | Anderson ........... G06F 16/2365 |
| 2012/0198322 A1 * | 8/2012 | Gulwani ............... G06F 40/177 715/212 |
| 2014/0304217 A1 * | 10/2014 | Nowakowski ........ G06F 16/254 707/602 |
| 2017/0132296 A1 * | 5/2017 | Ding ..................... G06F 16/248 |
| 2017/0344433 A1 * | 11/2017 | Bae ...................... G06F 11/1456 |
| 2019/0278862 A1 * | 9/2019 | Kapoor ................ G06F 16/2282 |
| 2020/0104391 A1 * | 4/2020 | Laskawiec .......... G06F 16/2365 |
| 2020/0401569 A1 | 12/2020 | Kumar |

FOREIGN PATENT DOCUMENTS

CN            114153820 A        3/2022

* cited by examiner

*Primary Examiner* — Phong H Nguyen
(74) *Attorney, Agent, or Firm* — Foley IP Law, PLLC

(57) ABSTRACT

In some embodiments, apparatuses and methods are provided herein useful to validating migrated data. In some embodiments, there is provided a system for validating migrated data including a control circuit configured to migrate data from a first database platform to a second database platform and validate the migrated data. The control circuit configured to transmit a message indicating a mismatch in response to a determination that a first single aggregated hash value does not match with a second single aggregated hash value.

20 Claims, 8 Drawing Sheets

SYSTEMS AND METHODS FOR DATA VALIDATION

TECHNICAL FIELD

This invention relates generally to validating migrated data, and more specifically, relates to validating data migrated from multiple data sources.

BACKGROUND

It is sometimes needed to migrate data from one or more data sources such as on-premise storage systems to cloud storage system or migrating the data across two or more cloud storage systems. Generally, there are no measures of quality of data or guarantee of accuracy when data is migrated from a data source. Moreover, for cloud migrations where data volume is enormous, only a sample of the migrated data is validated instead of validating all of the migrated data.

BRIEF DESCRIPTION OF THE DRAWINGS

Disclosed herein are embodiments of systems, apparatuses and methods pertaining to validating migrated data. This description includes drawings, wherein.

Figure 1:
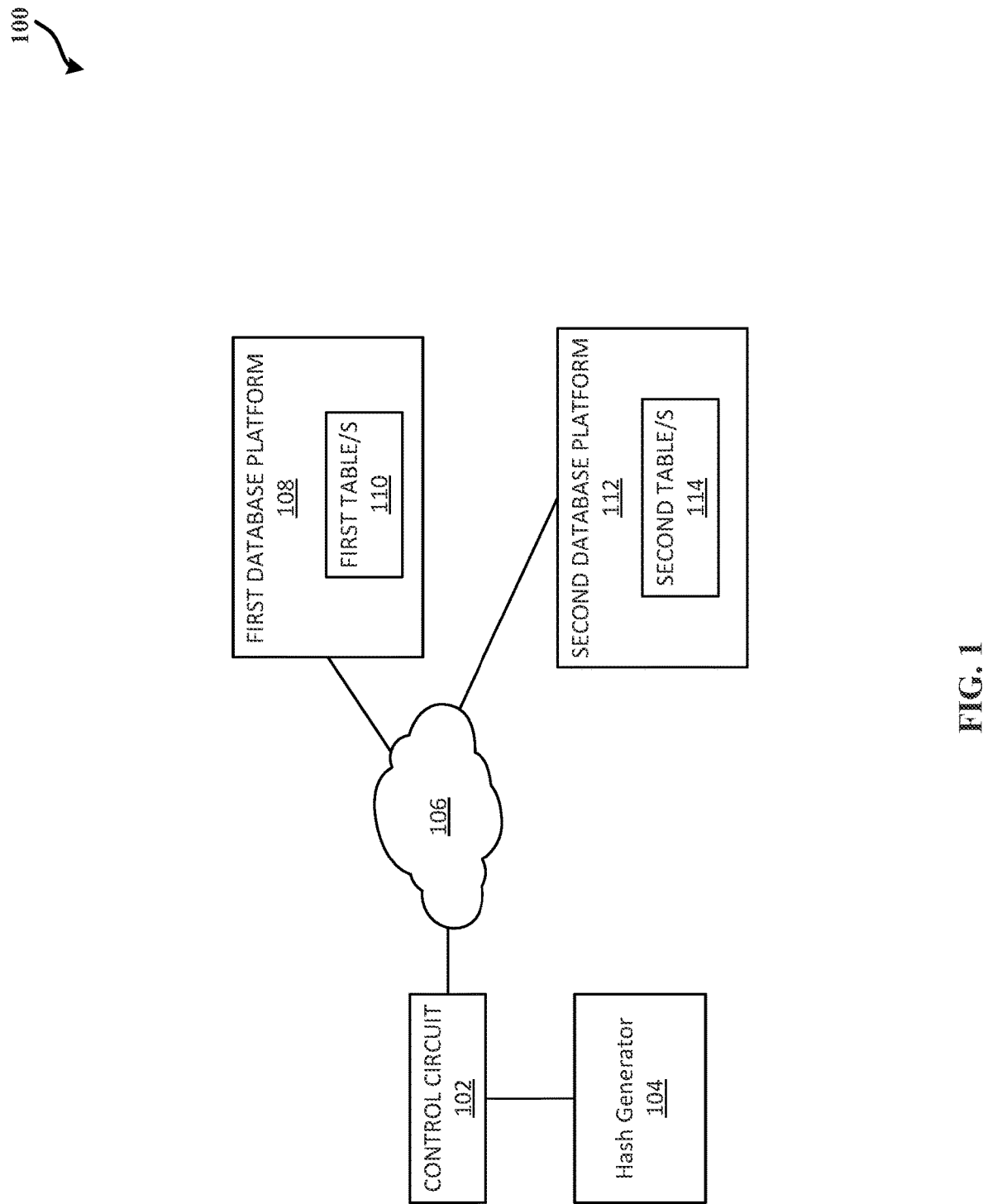
FIG. 1 illustrates a simplified block diagram of an exemplary system for validating migrated data in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the invention. Also, common but well-understood elements that are useful or necessary in a commercially feasible embodiment are often not depicted in order to facilitate a less obstructed view of these various embodiments of the invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for validating migrated data. In some embodiments, a system for validating migrated data includes a control circuit. The control circuit may migrate data from a first database platform to a second database platform. In some embodiments, a data migration performed by the control circuit includes copying data of a first table of a plurality of first tables stored in the first database platform to a second table of a plurality of second tables stored in the second database platform; validating the migrated data; and transmitting a message indicating a mismatch in response to a determination that the first single aggregated hash value does not match with the second single aggregated hash value. In some embodiments, a data validation performed by the control circuit includes the following steps: transforming the first table into a first transformed table in accordance with a standard table format; transforming the second table into a second transformed table in accordance with the standard table format; converting each row of the first transformed table into a first corresponding hash value; converting each row of the second transformed table into a second corresponding hash value; determining a first corresponding representative value of the first corresponding hash value of each row of the first transformed table; determining a second corresponding representative value of the second corresponding hash value of each row of the second transformed table; aggregating all of first corresponding representative values of the first transformed table into a first single aggregated hash value; aggregating all of second corresponding representative values of the second transformed table into a second single aggregated hash value; and comparing the first single aggregated hash value with the second single aggregated hash value.

In some embodiments, a method for validating migrated data includes migrating, by a control circuit, data from a first database platform storing a plurality of first tables to a second database platform storing a plurality of second tables. A data migration may include copying data of a first table of the plurality of first tables of the first database platform to a second table of the plurality of second tables of the second database platform. In some embodiments, the method includes validating, by the control circuit, the migrated data. A data validation may include the following steps: transforming the first table into a first transformed table in accordance with a standard table format; transforming the second table into a second transformed table in accordance with the standard table format; converting each row of the first transformed table into a first corresponding hash value; converting each row of the second transformed table into a second corresponding hash value; determining a first corresponding representative value of the first corresponding hash value of each row of the first transformed table; determining a second corresponding representative value of the second corresponding hash value of each row of the second transformed table; aggregating all of first corresponding representative values of the first transformed table into a first single aggregated hash value; aggregating all of second corresponding representative values of the second transformed table into a second single aggregated hash value; and comparing the first single aggregated hash value with the second single aggregated hash value. In some embodiments, the method includes transmitting, by the control circuit, a message indicating a mismatch in response to a determination that the first single aggregated hash value does not match with the second single aggregated hash value.

Figure 5A:
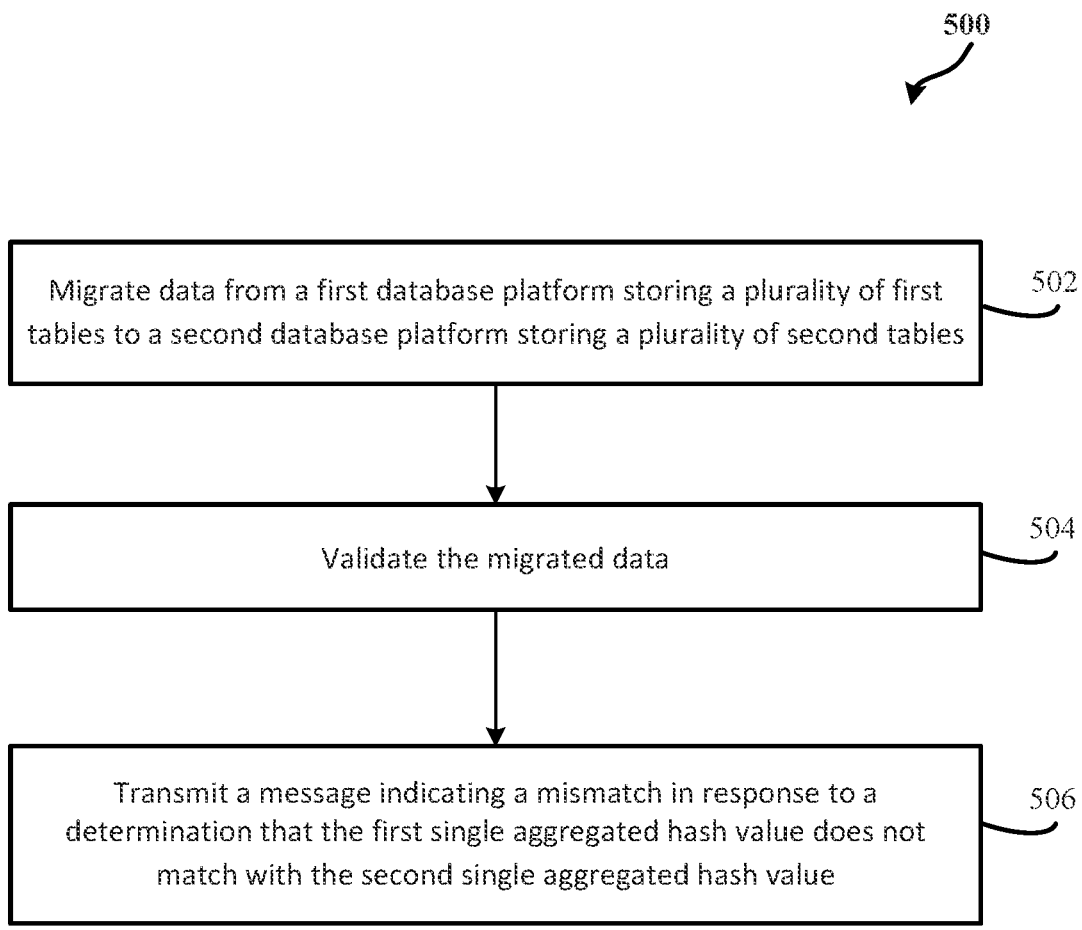
FIGS. 5A-5B show a flow diagram of an exemplary method of validating migrated data in accordance with some embodiments.
Figure 5B:
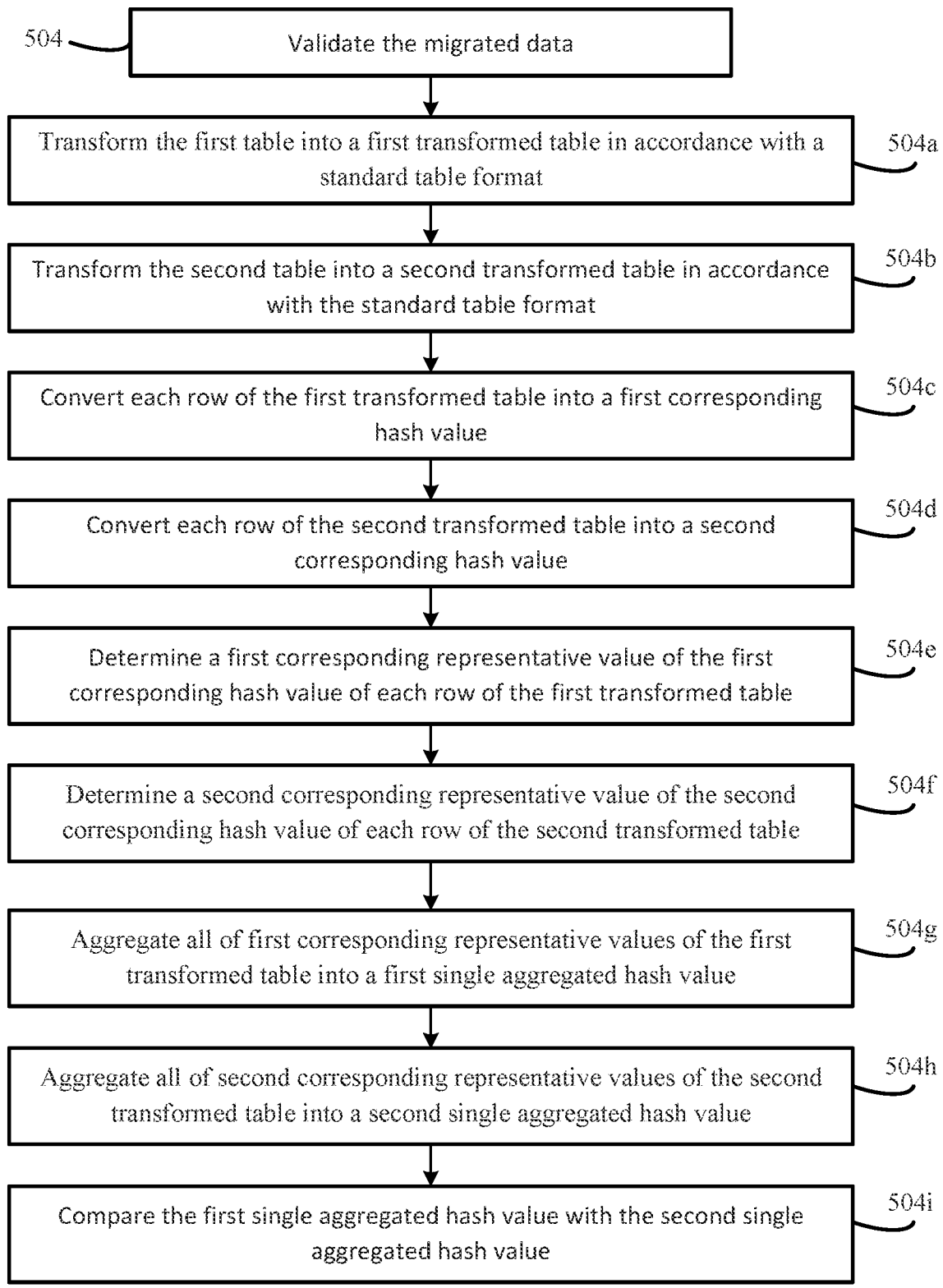

FIGS. 1, 5A, and 5B are described concurrently. FIG. 1 illustrates a simplified block diagram of an exemplary system 100 for validating migrated data in accordance with some embodiments. FIGS. 5A-5B show a flow diagram of an exemplary method 500 of validating migrated data in accordance with some embodiments. The system 100 includes a control circuit 102 operably coupled to a first database platform 108 and/or a second database platform 112 via a communication network 106. In some embodiments, a database platform includes Improvado, Microsoft SQL Server, Postgre SQL, My SQL, Amazon RDS, Oracle RDBMS, Razor SQL, and SQL Developer, to name a few. In some embodiments, the first database platform 108 is different and distinct from the second database platform. In such embodiments, each database platform may have different storage and/or retrieval protocol. In some embodiments, the first database platform 108 and/or the second database platform 112 include an on-premise database platform and a cloud database platform, to name a few. In an illustrative non-limiting example, the first database platform 108 is an on-premise database platform and the second database platform 112 is a cloud database platform. In another illustrative non-limiting example, the first database platform 108 is a first cloud database platform and the second database platform 112 is a second cloud database platform. In some embodiments, the first table 110 and the second table 114 each includes a billion or more rows of data.

In some embodiments, the system 100 includes a hash generator 104. In an illustrative non-limiting example, the hash generator 104 includes programming code stored in a memory and executable by the control circuit 102 to perform a data migration and/or validation. For example, the control circuit 102, at step 502, may migrate data from a first database platform 108 to a second database platform 112. In some embodiments, a data migration performed by the control circuit 102 includes copying data of a first table of a plurality of first tables 110 stored in the first database platform 108 to a second table of a plurality of second tables 114 stored in the second database platform 112.

In some embodiments, the control circuit 102, at step 504, validates the migrated data. For example, a data validation performed by the control circuit 102, at step 504a, transforms the first table into a first transformed table in accordance with a standard table format. In some embodiments, the standard table format may be customized based on the requirements or needs of the data migration. Alternatively, or in addition to, at step 504b, the data validation may include the control circuit 102 transforming the second table into a second transformed table in accordance with the standard table format. For example, a first table format of the plurality of first tables 110 may be in accordance with the first database platform 108, and a second table format of the plurality of second tables 114 may be in accordance with the second database platform 112. As such, the invention may be database platform independent that is the invention may be capable of migrating data from one database platform to another database platform regardless of whether the two database platforms are the same (e.g., migrating data from a My SQL database to another My SQL database) or different (e.g., migrating data from a My SQL database to an Oracle RDBMS).

In some embodiments, a transformation of a table into a transformed table includes verifying that the contents or data in the table are the same and/or in the same format. For example, if the order date in a first table of the first database platform 108 is in Month Date Year (e.g., 10-01-2022) format and the order date in a second table is Date Month Year (e.g., 1 Oct. 2022) format in the second database platform 112, and the date format defined in the standard table format is Year-Month-Date (e.g., 2022-10-01), then the order date in the transformed table of the first table will follow the format as defined in the standard table format. As such, in a transformed table, for example, the dates will be in the Year-Month-Date. For example, if the amount in a first table of the first database platform 108 is in Decimal (34, 2) (e.g., 35.12) format and the amount in a second table is Decimal (34, 6) (e.g., 35.120000) format in the second database platform 112, and the decimal format defined in the standard table format is Decimal (34, X) where X is the precision without trailing zeroes (e.g., Decimal (34,2), in this case the amount value would be 35.12).

Alternatively, or in addition to, at step 504c, the data validation may include the control circuit 102 converting each row of the first transformed table into a first corresponding hash value. Alternatively, or in addition to, at step 504d, the data validation may include the control circuit 102 converting each row of the second transformed table into a second corresponding hash value. In some embodiments, the control circuit 102 may use one or more publicly known hash functions and/or algorithm to convert data into a corresponding hash value. For example, all the columns in the first row are converted into a string format and then concatenated into a single row leveraging the standard table format and is represented as single value. Thereby, each row is compressed using\lossless compression algorithms to produce a 40-bit hexadecimal value representing each row.

Alternatively, or in addition to, at step 504e, the data validation may include the control circuit 102 determining a first corresponding representative value of the first corresponding hash value of each row of the first transformed table. For example, a representative value may correspond to a hexadecimal (hex) value, a binary value, and/or any other alphanumeric format. Alternatively, or in addition to, at step 504f, the data validation may include the control circuit 102 determining a second corresponding representative value of the second corresponding hash value of each row of the second transformed table. As such, after hashing a row of data, the control circuit 102 determines a representative value (e.g., a hex value) of the hashed data. For example, the control circuit 102 determines a corresponding hex value for each letter or number of the hashed data. For example, from FIG. 4B, the first row values from 206b are concatenated as G36CZ-C44ER||2021-05-12||M306||35.12||IN-TRANSIT which is then represented as a corresponding hash value 367a37c2968be6f968d80effc303e185.

Alternatively, or in addition to, at step 504g, the data validation may include the control circuit 102 aggregating all of first corresponding representative values of the first transformed table into a first single aggregated hash value. Alternatively, or in addition to, at step 504h, the data validation may include the control circuit 102 aggregating all of second corresponding representative values of the second transformed table into a second single aggregated hash value. In some embodiments, an aggregation of a plurality of representative values of a transformed table into a singular aggregated hash value corresponds to summing the plurality of representative values. In such embodiments, a resulting summed value corresponds to the singular aggregated hash value. For example, each of the row from table 206b in FIG. 4B is represented as 367a37c2968be6f968d80effc303e185, 150142437200a8dd057f58511268c944, 8a1236f482edb28bdedce4e9bfaf9488, fee67ee2d09007ba6cf1e3bc6bbea7b4 which is aggregated into a single hex value b347c9bc2026eb0dd15a6247dcb7ab9f using SAMS HASH AGGREGATOR 212 from FIG. 2.

Alternatively, or in addition to, at step 504*i*, the data validation may include the control circuit 102 comparing the first single aggregated hash value with the second single aggregated hash value. In some embodiments, the control circuit 102, at step 506, transmits a message indicating a mismatch in response to a determination that the first single aggregated hash value does not match with the second single aggregated hash value. In yet some embodiments, the control circuit 102 transmits a second message corresponding to a verification that migrated data and source data are a match in response to a determination that the first single aggregated hash value matches with the second single aggregated hash value.

Figure 2:
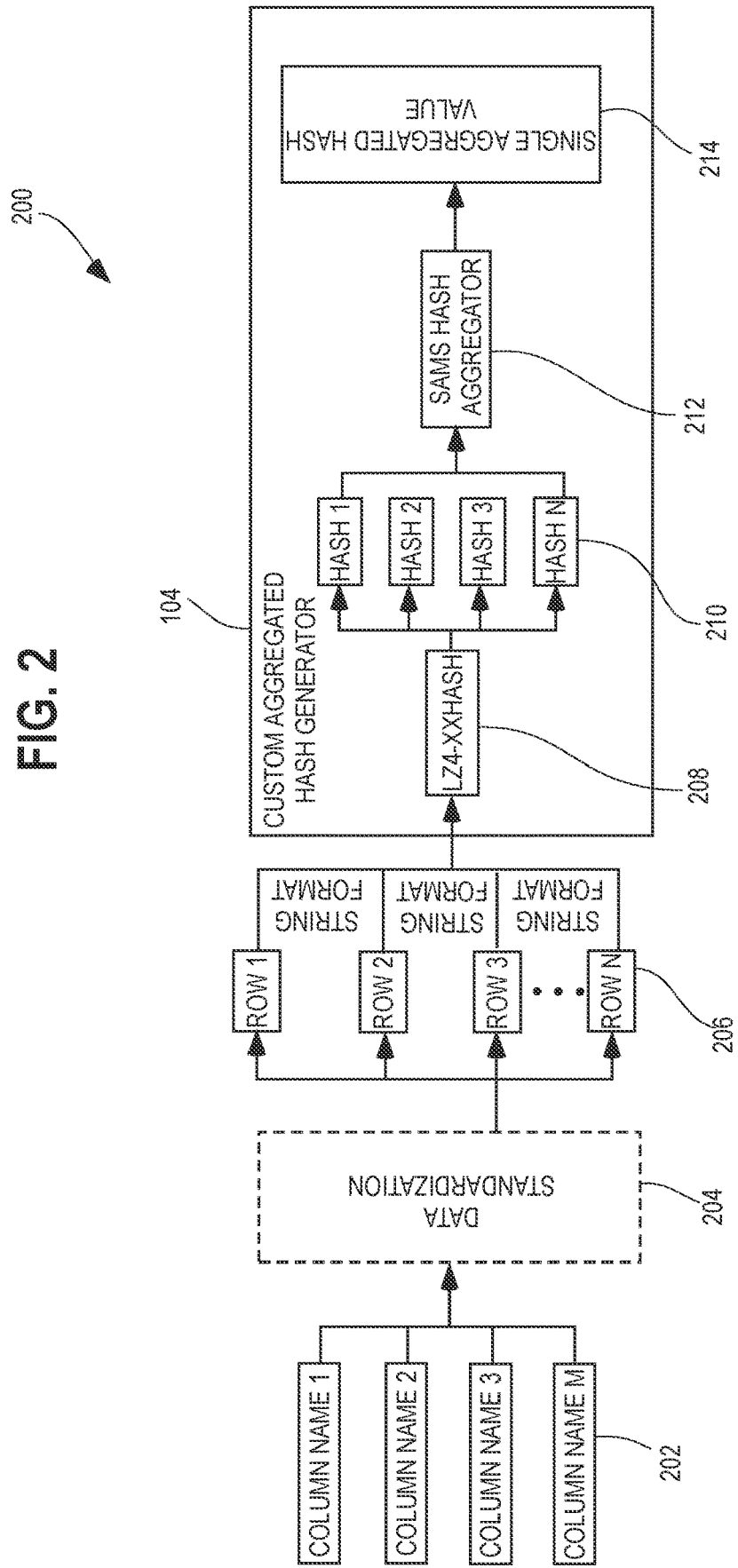
FIG. 2 shows a flow diagram of an exemplary method of validating migrated data in accordance with some embodiments.

FIG. 2 shows a flow diagram of an exemplary method 200 of validating migrated data in accordance with some embodiments. In some embodiments, one or more steps of the method 200 is performed by the control circuit 102 and/or the hash generator 104. In an illustrative non-limiting example, a first table 202 having column names 1, 2, 3, and M are input into a data standardization module 204. The data standardization module 204 may transform the first table 202 of the first database platform 108 into a first transformed table 206 in accordance with a standard table format. In some embodiments, the standard table format corresponds to a predetermined table format set for a particular data migration and/or determined or chosen by a user. In some embodiments, the hash generator 104 includes the data standardization module 204.

In some embodiments, a hash convertor module 208 of the hash generator 104 converts each row of the first transformed table 206 into a first corresponding hash value 210. For example, Row 1 of the first transformed table 206 is converted into the Hash 1. In some embodiments, the hash convertor module 208 converts a row of a transformed table into a hash value, then further converts the hash value into a representative value (e.g., a hex value). In such embodiments, the first corresponding hash value 210 corresponds to the representative value of the hashed value of the first transformed table 206. In some embodiments, a hash aggregator 212 aggregates all of the first corresponding hash value 210 into a first single aggregated hash value 214. For example, Hash 1, Hash 2, Hash 3, and Hash N of the first corresponding hash value 210 are input into the hash aggregator 212. The hash aggregator 212 then outputs the first single aggregated hash value 214. In some embodiments, the hash aggregator 212 aggregates by summing all hashed values. In yet some embodiments, the hash aggregator 212 aggregates by appending all hashed values into single aggregated hash value.

Figure 3:
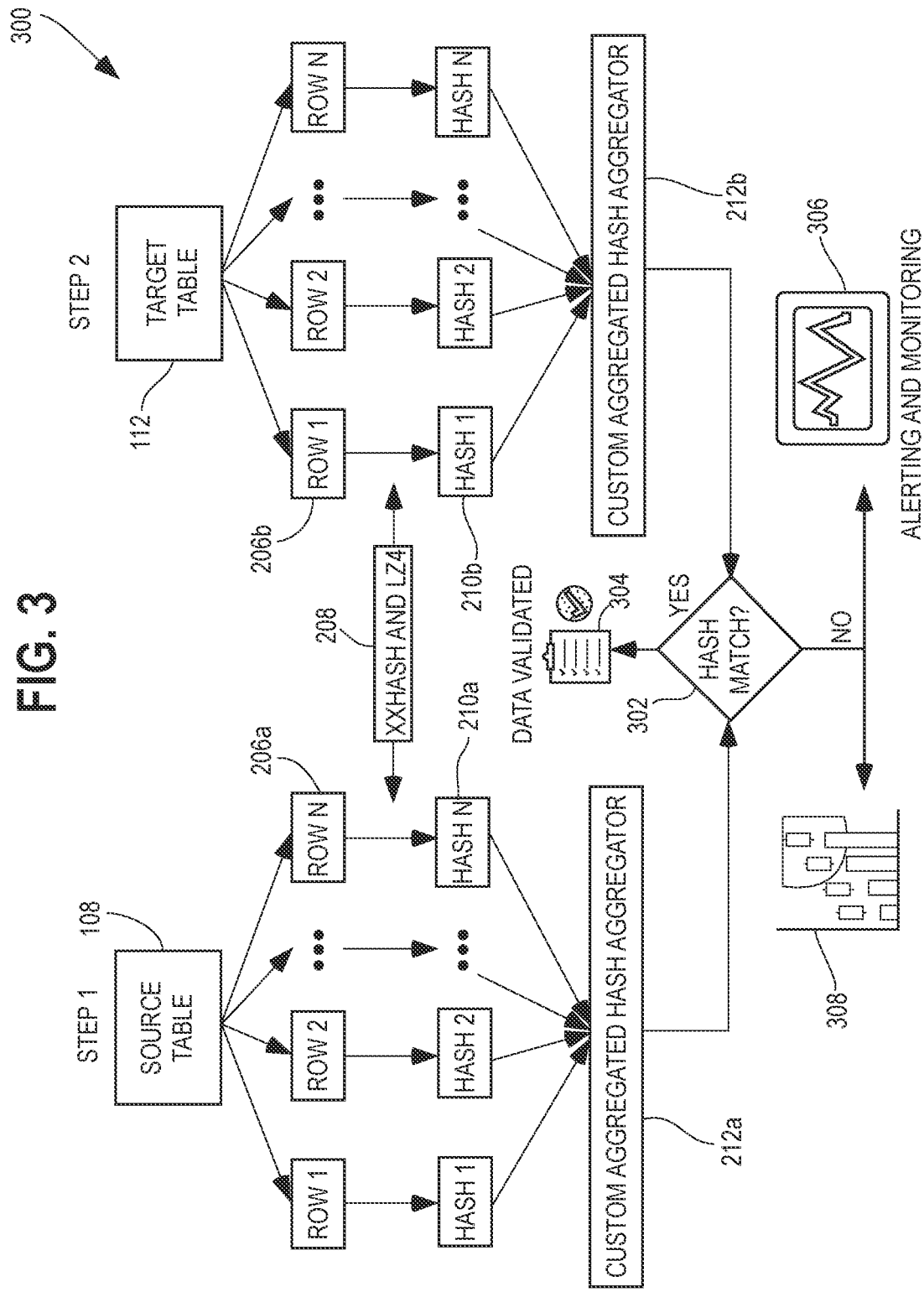
FIG. 3 shows a flow diagram of an exemplary method of validating migrated data in accordance with some embodiments.

The steps illustrated in FIG. 2 are separately performed in the first database platform 108 and in the second database platform 112 as shown in FIG. 3. FIG. 3 shows a flow diagram of an exemplary method 300 of validating migrated data in accordance with some embodiments. In some embodiments, one or more steps in the method 200 are included in the method 300. In an illustrative non-limiting example, in response to the control circuit 102 executing the steps shown in method 200, the control circuit 102, at step 302, compares a first single aggregated hash value 212*a* with a second single aggregated hash value 212*b*. In some embodiments, the control circuit 102, at step 306, transmits a message indicating a mismatch in response to a determination that the first single aggregated hash value 212*a* does not match with the second single aggregated hash value 212*b*. In some embodiments, the control circuit 102, at step 304, transmits a message indicating a match in response to a determination that the first single aggregated hash value 212*a* matches with the second single aggregated hash value 212*b*.

Alternatively, or in addition to, in validating the migrated data, the control circuit 102, compares each of the first corresponding representative values 210*a* to a corresponding one of the second corresponding representative values 210*b*. Alternatively, or in addition to, the control circuit 102, at step 308, may transmit a second message indicating a cause of the mismatch upon a determination that one or more of the first corresponding representative values 210*a* do not match with one or more corresponding ones of the second corresponding representative values 210*b*.

In some embodiments, an entire database is being migrated from one database platform to another database platform. For example, the control circuit 102 may copy data of remaining tables of a plurality of first tables of the first database platform 108 to corresponding remaining tables of the plurality of second tables of the second database platform 112. In some embodiments, the data validation is performed by the control circuit 102 on the remaining tables of the plurality of first tables and the corresponding remaining tables of the plurality of second tables. Alternatively, or in addition to, the control circuit 102 may transmit a second message indicating a second mismatch in response to a determination that each of resulting single aggregated hash values of the data validation of the remaining tables of the plurality of first tables does not match with a corresponding one of resulting corresponding single aggregated hash values of the data validation of the corresponding remaining tables of the plurality of second tables.

Figure 4A:
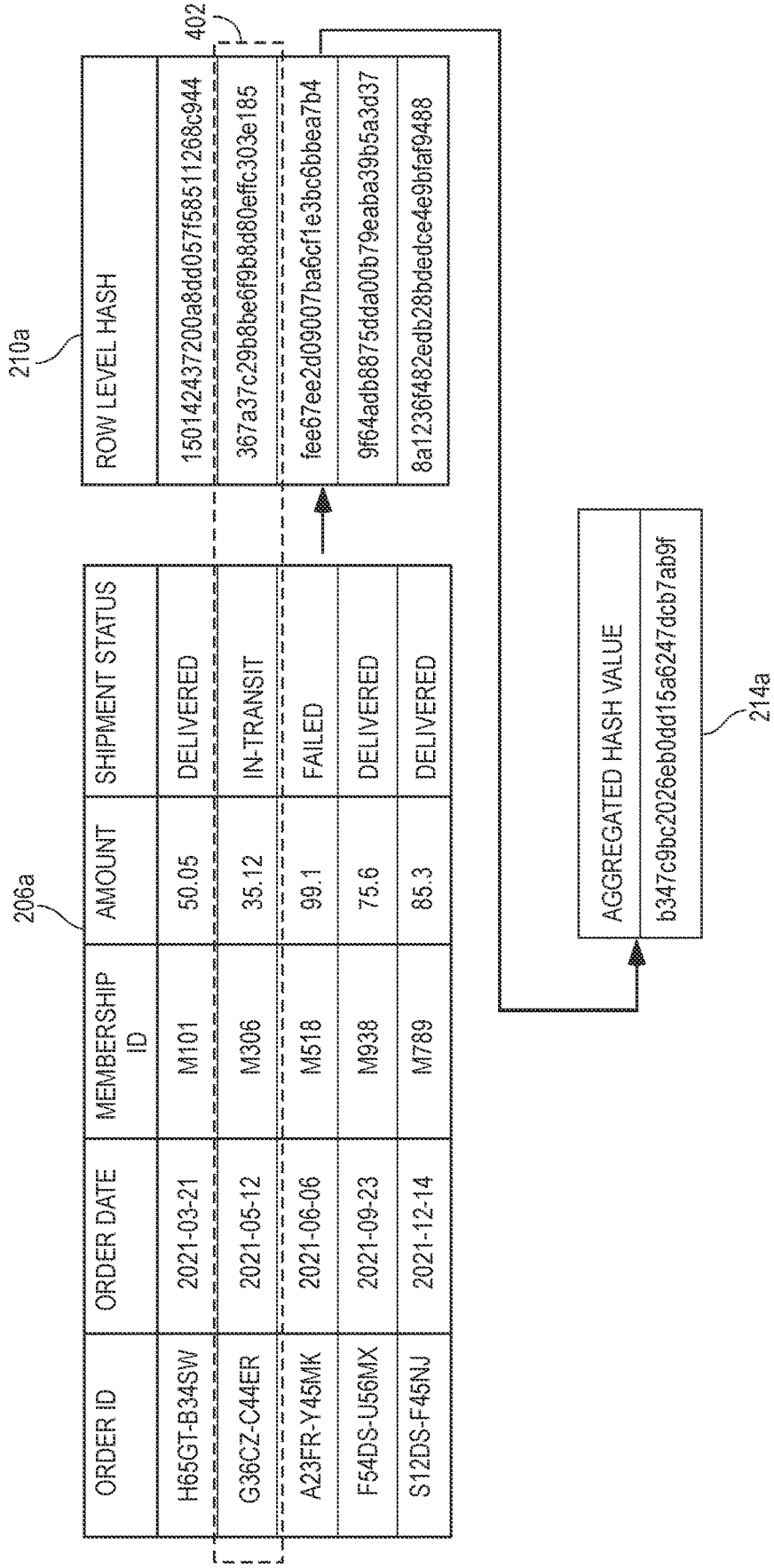
FIGS. 4A-4B illustrate exemplary migration and validation of an example table in accordance with some embodiments.
Figure 4B:
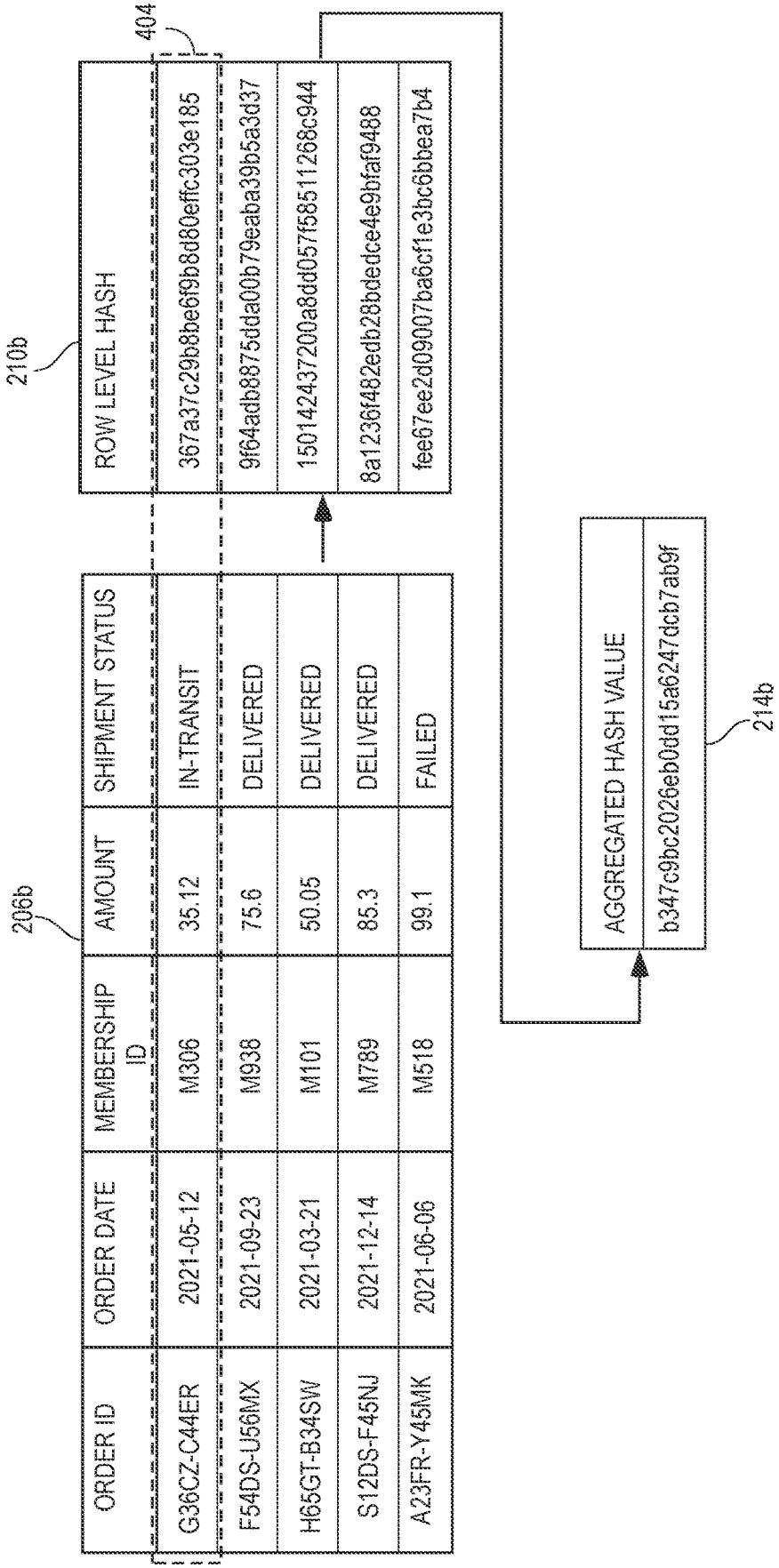

FIGS. 4A-4B illustrate exemplary migration and validation of an example table in accordance with some embodiments. FIG. 4A shows a first transformed table 206*a* associated with a first database platform 108. There are 5 rows in the first transformed table 206*a*. In particular, the second row 402 corresponds to Order ID G36CZ-C44ER. FIG. 4B shows a second transformed table 206*b* associated with a second database platform 112. As shown, the data in the first transformed table 206*a* and the data in the second database platform 112 are the same. Moreover, the resulting first single aggregated hash value 214*a* and the resulting second single aggregated hash value 214*b* are the same. Thus, despite the data corresponding to Order ID G36CZ-C44ER is in the second row 402 in the first transformed table 206*a* and in the first row 404 in the second transformed table 206*b*, their corresponding single aggregated hash value are the same; thereby, validating that the migration of data of the example table from a source database platform (e.g., the first database platform 108) to a target database platform (e.g., the second database platform 112). Thus, if any of the migrated data in any row in the target database platform is corrupted and/or an error is introduced during the migration, the particular row that has the error will have a different hash value compared to the corresponding row in the source database platform in addition to the second single aggregated hash value 214*b* associated with the target database platform and the first single aggregated hash value 214*a* associated with the source database platform being different.

Figure 6:
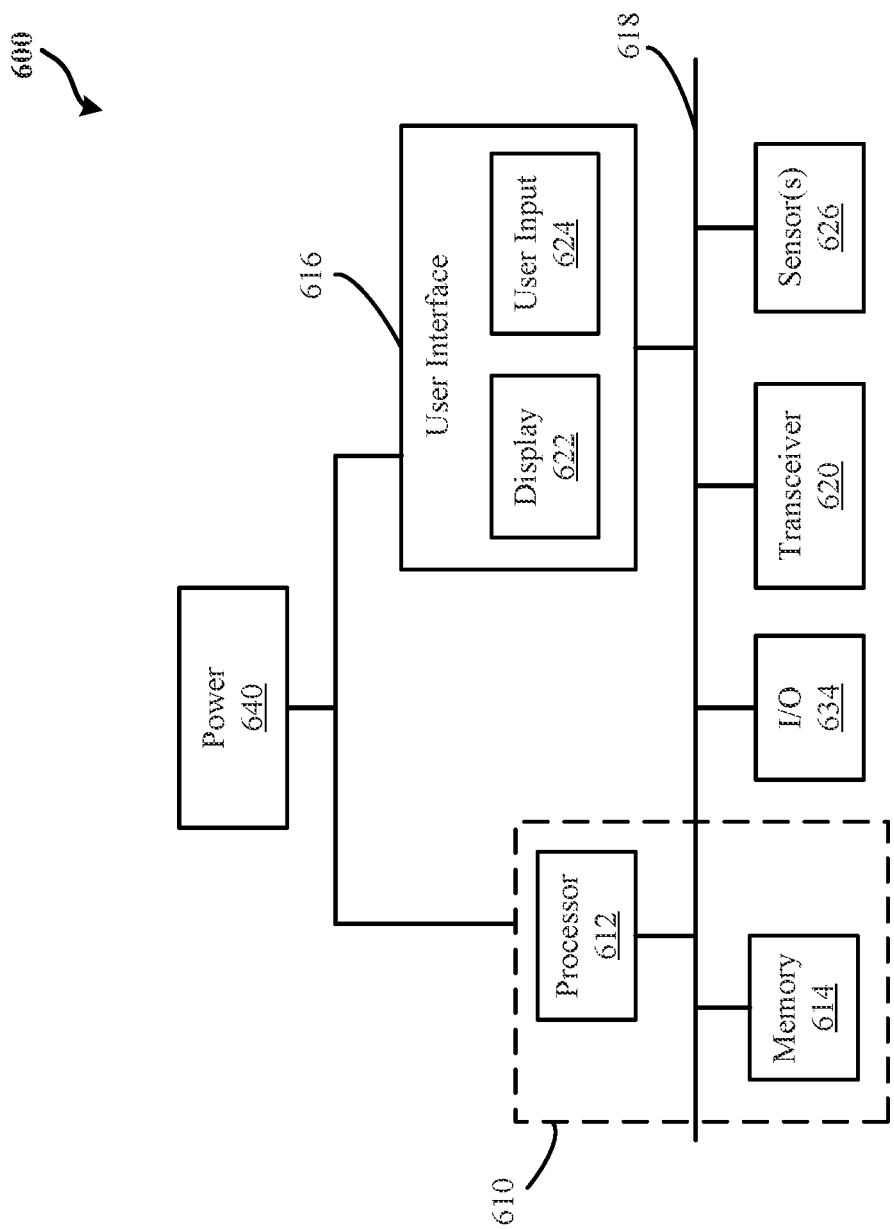
FIG. 6 illustrates an exemplary system for use in implementing methods, techniques, devices, apparatuses, systems, servers, and sources for validating migrated data, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the system 100 of FIG. 1, the method 200 of FIG. 2, the method 300 of FIG. 3, the method 500 of FIG. 5, and/or other above or below mentioned systems or devices, or parts of such circuits, circuitry, functionality, systems, apparatuses, processes, or devices. For example, the system 600 may be used to implement some or all of the system for validating migrated data, the control circuit 102, the first database platform 108, the second database platform 112, the hash generator 104, the communication network 106, and/or other such components, circuitry, functionality and/or devices. However, the use of the system 600 or any portion thereof is certainly not required.

By way of example, the system 600 may comprise a processor module (or a control circuit) 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system 600 may implement the system for validating migrated data with the control circuit 102 being the control circuit 612.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) interface 634 that allow one or more devices to couple with the system 600. The I/O interface can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the control circuit 102, the first database platform 108, the second database platform 112, the hash generator 104, the communication network 106, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for validating migrated data, the system comprising:
a control circuit configured to: migrate data from a first table in a first database platform to a second table in a second database platform and to validate the migrated data of the second table in the second database platform with the data of the first table in the first database platform prior to modifying any data in either of the first table or the second table following the data migration, wherein validating the migrated data includes the following steps:
transforming the first table into a first transformed table in accordance with a standard table format;
transforming the second table into a second transformed table in accordance with the standard table format;
converting rows of the first transformed table into first hash values, each of the first hash values being generated from a different one of the rows of first transformed table first corresponding hash values;
converting rows of the second transformed table into second hash values, each of the second hash values being generated from a different one of the rows of second transformed table;
determining first representative hexadecimal (hex) values for the first hash values, each of the first representative hex values being associated with a different one of the rows of first transformed table;
determining second representative hex values for the second hash values, each of the second representative hex values being associated with a different one of the rows of second transformed table;
aggregating all of first representative hex values into a first single representative hex value;
aggregating all of second representative hex values into a second single representative hex value;
determining that the first single representative hex value does not match the second single representative hex value; and
transmitting transmit a message indicating a mismatch in response to determining that the first single representative hex value does not match the second single representative hex value.

2. The system of claim 1, wherein the first database platform is different and distinct from the second database platform each having different storage and retrieval protocol.

3. The system of claim 1, wherein aggregating all of the first representative hex values into a first single representative hex values includes summing the first representative hex values.

4. The system of claim 1, wherein the first table and the second table each includes a billion or more rows of data.

5. The system of claim 1, wherein the validating the migrated data further includes comparing each of the first representative hex values with a corresponding one of the second representative hex values, and wherein the control circuit is further configured to transmit a second message indicating a cause of the mismatch upon a determination that one or more of the first representative hex values does not match with a corresponding one of the second representative hex values.

6. The system of claim 1, wherein the first database platform is an on-premise database platform.

7. The system of claim 6, wherein the second database platform is a cloud database platform.

8. The system of claim 1, wherein the first database platform and the second database platform are independent cloud database platforms.

9. A method comprising:
migrating data from a first table in a first database platform to a second table in a second database platform;
validating the migrated data of the second table in the second database platform with the data of the first table in the first database platform prior to modifying any data in either of the first table or the second table following the data migration, wherein validating the migrated data includes:
transforming the first table into a first transformed table in accordance with a standard table format;
transforming the second table into a second transformed table in accordance with the standard table format;
converting rows of the first transformed table into first hash values, each of the first hash values being generated from a different one of the rows of first transformed table first corresponding hash values;
converting rows of the second transformed table into second hash values, each of the second hash values being generated from a different one of the rows of second transformed table;
determining first representative hexadecimal (hex) values for the first hash values, each of the first representative hex values being associated with a different one of the rows of first transformed table;
determining second representative hex values for the second hash values, each of the second representative hex values being associated with a different one of the rows of second transformed table;
aggregating all of first representative hex values into a first single representative hex value;
aggregating all of second representative hex values into a second single representative hex value;
determining that the first single representative hex value does not match the second single representative hex value; and
transmitting transmit a message indicating a mismatch in response to determining that the first single representative hex value does not match the second single representative hex value.

10. The method of claim 9, wherein the first database platform is different and distinct from the second database platform each having different storage and retrieval protocol.

11. The method of claim 9, wherein aggregating all of the first representative hex values into a first single representative hex values includes summing the first representative hex values.

12. The method of claim 9, wherein the first table and the second table each includes a billion or more rows of data.

13. The method of claim 9, wherein the validating the migrated data further includes comparing each of the first representative hex values with a corresponding one of the second representative hex values, and wherein the method further includes transmitting a second message indicating a cause of the mismatch upon a determination that one or more of the first representative hex values does not match with a corresponding one of the second representative hex values.

14. The method of claim 9, wherein the first database platform is an on-premise database platform.

15. The method of claim 14, wherein the second database platform is a cloud database platform.

16. The method of claim 9, wherein the first database platform and the second database platform are independent cloud database platforms.

17. A non-transitory computer-readable medium storing programming instructions for execution by a processor, the programming instructions causing the processor to:
migrate data from a first table in a first database platform to a second table in a second database platform;
validate the migrated data of the second table in the second database platform with the data of the first table in the first database platform prior to modifying any data in either of the first table or the second table following the data migration, wherein the instructions to validate the migrated data include instructions to:
transform the first table into a first transformed table in accordance with a standard table format;
transform the second table into a second transformed table in accordance with the standard table format;
convert rows of the first transformed table into first hash values, each of the first hash values being generated from a different one of the rows of first transformed table first corresponding hash values;
convert rows of the second transformed table into second hash values, each of the second hash values being generated from a different one of the rows of second transformed table;
determine first representative hexadecimal (hex) values for the first hash values, each of the first representative hex values being associated with a different one of the rows of first transformed table;
determine second representative hex values for the second hash values, each of the second representative hex values being associated with a different one of the rows of second transformed table;
aggregate all of first representative hex values into a first single representative hex value;
aggregate all of second representative hex values into a second single representative hex value;
determine that the first single representative hex value does not match the second single representative hex value; and
transmit a message indicating a mismatch in response to determining that the first single representative hex value does not match the second single representative hex value.

18. The non-transitory computer-readable medium of claim 17, wherein the first database platform is different and distinct from the second database platform each having different storage and retrieval protocol.

19. The non-transitory computer-readable medium memory of claim 17, wherein aggregating all of the first representative hex values into a first single representative hex values includes summing the first representative hex values.

20. The non-transitory computer-readable medium memory of claim 17, wherein the first table and the second table each includes a billion or more rows of data.

* * * * *